(12) United States Patent
Lin

(10) Patent No.: US 8,302,419 B2
(45) Date of Patent: *Nov. 6, 2012

(54) COMPUTER COOLING APPARATUS

(75) Inventor: Pei-Hsi Lin, Sijhih (TW)

(73) Assignee: Thermal Take Technology Co., Ltd. (TW)

( * ) Notice: Subject to any disclaimer, the term of this patent is extended or adjusted under 35 U.S.C. 154(b) by 929 days.

This patent is subject to a terminal disclaimer.

(21) Appl. No.: 12/113,967

(22) Filed: May 2, 2008

(65) Prior Publication Data

US 2009/0272143 A1 Nov. 5, 2009

(51) Int. Cl.
*F25D 23/12* (2006.01)
*H05K 7/20* (2006.01)

(52) U.S. Cl. .................. 62/259.2; 361/679.46

(58) Field of Classification Search ............... 62/259.2; 361/69.46, 679.47, 679.537, 679.46, 679.53
See application file for complete search history.

(56) References Cited

U.S. PATENT DOCUMENTS

| | | | | |
|---|---|---|---|---|
| 3,817,321 A * | 6/1974 | Von Cube et al. | ...... | 165/104.22 |
| 5,706,668 A * | 1/1998 | Hilpert | ...... | 62/259.2 |
| 5,906,497 A * | 5/1999 | Pham et al. | ...... | 439/160 |
| 6,196,003 B1 * | 3/2001 | Macias et al. | ...... | 62/3.7 |
| 6,205,803 B1 * | 3/2001 | Scaringe | ...... | 62/259.2 |
| 6,233,959 B1 * | 5/2001 | Kang et al. | ...... | 62/259.2 |
| 6,285,550 B1 * | 9/2001 | Belady | ...... | 361/704 |
| 7,304,842 B2 * | 12/2007 | Yatskov | ...... | 361/679.48 |
| 7,310,230 B2 * | 12/2007 | Tustaniwskyi et al. | ...... | 361/699 |
| 7,675,751 B2 * | 3/2010 | Lin | ...... | 361/699 |
| 8,199,486 B2 * | 6/2012 | Chen et al. | ...... | 361/679.51 |
| 2002/0051341 A1 * | 5/2002 | Frutschy et al. | ...... | 361/700 |
| 2002/0066283 A1 * | 6/2002 | Oh et al. | ...... | 62/259.2 |
| 2002/0069661 A1 * | 6/2002 | Livni | ...... | 62/259.2 |
| 2003/0110788 A1 * | 6/2003 | Koeneman et al. | ...... | 62/259.2 |
| 2003/0151896 A1 * | 8/2003 | Zeighami et al. | ...... | 361/700 |
| 2003/0174468 A1 * | 9/2003 | Park et al. | ...... | 361/700 |
| 2005/0034466 A1 * | 2/2005 | Sato et al. | ...... | 62/118 |
| 2005/0144968 A1 * | 7/2005 | Shakespeare | ...... | 62/298 |
| 2005/0281016 A1 * | 12/2005 | Wang et al. | ...... | 361/810 |
| 2005/0284166 A1 * | 12/2005 | Mongia et al. | ...... | 62/259.2 |
| 2006/0185379 A1 * | 8/2006 | Shapiro | ...... | 62/259.2 |
| 2006/0218955 A1 * | 10/2006 | Liu et al. | ...... | 62/259.2 |
| 2006/0225449 A1 * | 10/2006 | Dorrich et al. | ...... | 62/259.2 |
| 2008/0259566 A1 * | 10/2008 | Fried | ...... | 361/699 |
| 2009/0178425 A1 * | 7/2009 | Tsuchiya | ...... | 62/259.2 |

* cited by examiner

*Primary Examiner* — Ljiljana Ciric
*Assistant Examiner* — Alexis Cox
(74) *Attorney, Agent, or Firm* — Schmeiser, Olsen & Watts, LLP

(57) ABSTRACT

An improved computer cooling apparatus includes: at least one evaporator installed on a surface of at least one heat generating source which is a central processing unit in a computer system unit; a compressor, connected to the evaporator; a condenser, connected to the compressor; an expansion valve, connected between the condenser and the evaporator; a fan, installed on a side of the condenser; and a coolant, circulating among the evaporator, the compressor, the condenser and the expansion valve. The evaporator, compressor, condenser, fan, expansion valve and coolant are used for achieving the effect of quickly dispersing a heat generating source in the computer system unit.

6 Claims, 8 Drawing Sheets

COMPUTER COOLING APPARATUS

FIELD OF THE INVENTION

The present invention relates to an improved computer cooling apparatus, and more particularly to a computer cooling apparatus capable of dispersing a heat source in a computer system for a quick heat dissipating effect.

BACKGROUND OF THE INVENTION

In general, a conventional heat dissipating assembly of a computer system installs a heat sink on a processor chip of a motherboard, and the heat sink is attached and covered on the top of the processor chip, and the heat sink includes a fan. The heat dissipating method uses the heat sink for absorbing the heat produced by the processor chip and expanding the area of the heat source, and the fan installed on the heat sink blows air to produce air flows to guide the hot air flow of the heat sink in different directions, so as to achieve the heat dissipating effect.

However, the interior of the computer casing is a closed space, and thus the hot air cannot be discharged directly and completely from the computer casing, but will be circulated in the computer casing instead, and it will result in a poor heat dissipating effect or fail to achieve the desired heat dissipation function. Therefore, an overheat of the processor chip occurs easily and lowers the operating performance or even causes a system crash.

Therefore, related manufacturers developed a heat dissipating apparatus with a water cooling block structure, which includes a base, an upper casing having a containing space and covering the base and input and output pipes installed on one side of the upper casing and interconnected with the containing space, so that the base can be attached onto a processor chip on a motherboard, and a working fluid is allowed to flow from the input pipe into the containing space for absorbing a heat source absorbed in the base. After the heat is absorbed, the heat source in the containing space absorbed by the working fluid is discharged from the output pipe for cooling to achieve the effects of overcoming the shortcomings of the prior art and providing a better way of dispersing the heat source.

Although the conventional water cooling block structure allows the working fluid to flow into the containing space from the input pipe to absorb heat and discharges the working fluid from the output pipe for cooling and dispersing the heat source, yet the heat dissipation is conducted by a heat exchange and the input pipe and the output pipe share a containing space, so that the working fluid, regardless of absorbing heat or not, is mixed with cold and hot fluids, and the temperature difference for the heat exchange becomes smaller, and causes a poor heat dissipation. Obviously, the conventional computer cooling apparatus with a water cooling block structure cannot meet the requirements of an actual use.

SUMMARY OF THE INVENTION

In view of the foregoing shortcomings of the prior art, the inventor of the invention based on years of experience in the related field to conduct extensive researches and experiments, and finally developed a computer cooling apparatus in accordance with the present invention to overcome the shortcomings of the prior art.

Therefore, it is a primary objective of the present invention to provide a computer cooling apparatus using an evaporator, a compressor, a condenser, a fan, an expansion valve and a coolant to achieve the effect of quickly dispersing the heat generating source in a computer system unit.

To achieve the foregoing objective, the present invention provides a first preferred embodiment of a computer cooling apparatus comprising: an evaporator installed on a surface of a central processing unit, wherein the central processing unit is installed on a surface of a motherboard of a computer system unit; a compressor, connected to the evaporator; a condenser, connected to the compressor; an expansion valve, connected between the condenser and the evaporator; a fan, installed on a surface of the condenser; and a coolant, circulated among the evaporator, the compressor, the condenser and the expansion valve.

The present invention provides a second preferred embodiment of a computer cooling apparatus, comprising: at least one evaporator, installed on a surface of at least one heat generating source, wherein the heat generating source is installed in a computer system unit; a compressor, connected to the evaporator; a condenser, connected to the compressor; an expansion valve, connected between the condenser and the evaporator; a fan, installed on a surface of the condenser; and a coolant, circulated among the evaporator, the compressor, the condenser and the expansion valve.

DESCRIPTION OF THE PREFERRED EMBODIMENT

Figure 1:
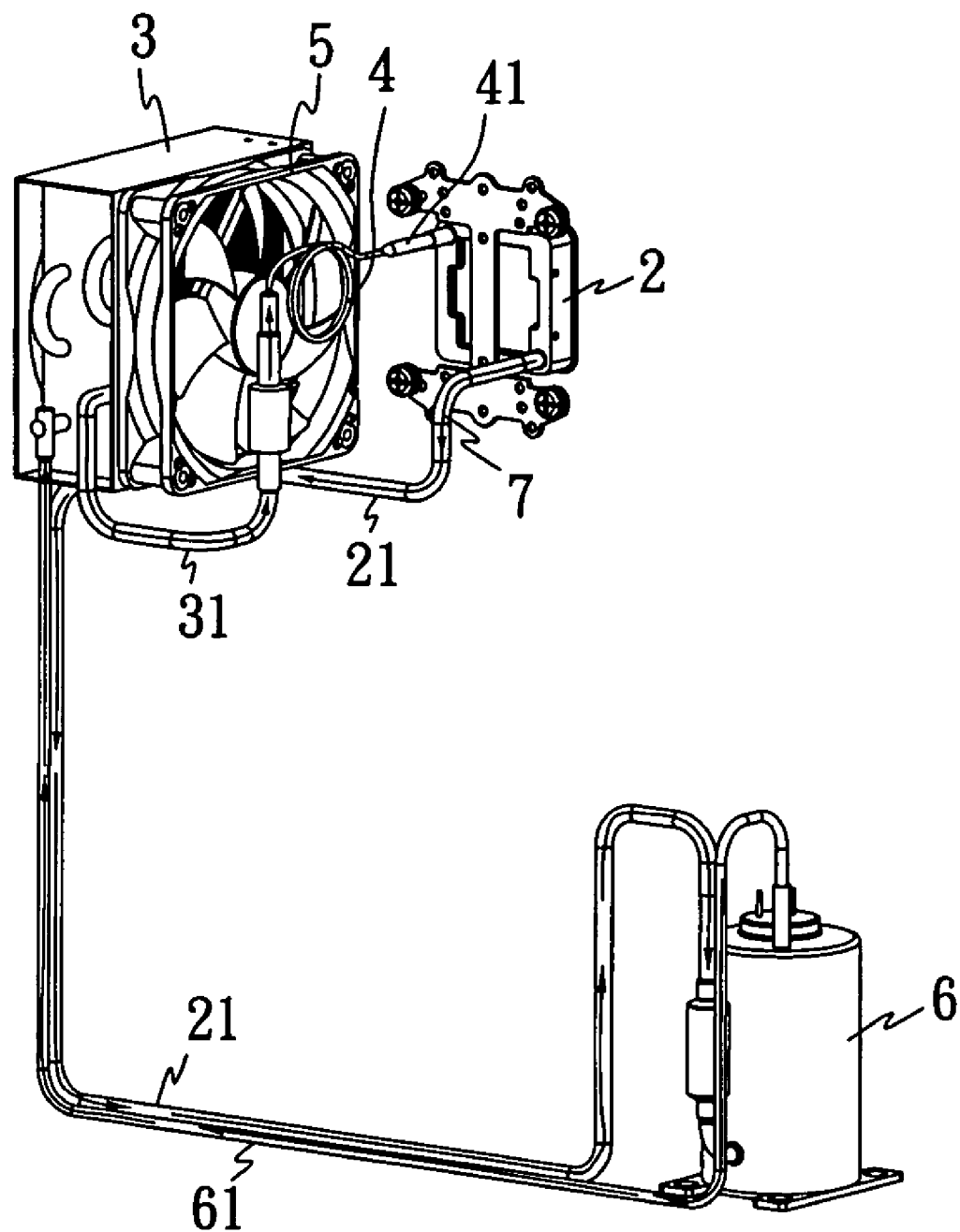
FIG. 1 is a perspective view of a first preferred embodiment of the present invention.
Figure 2:
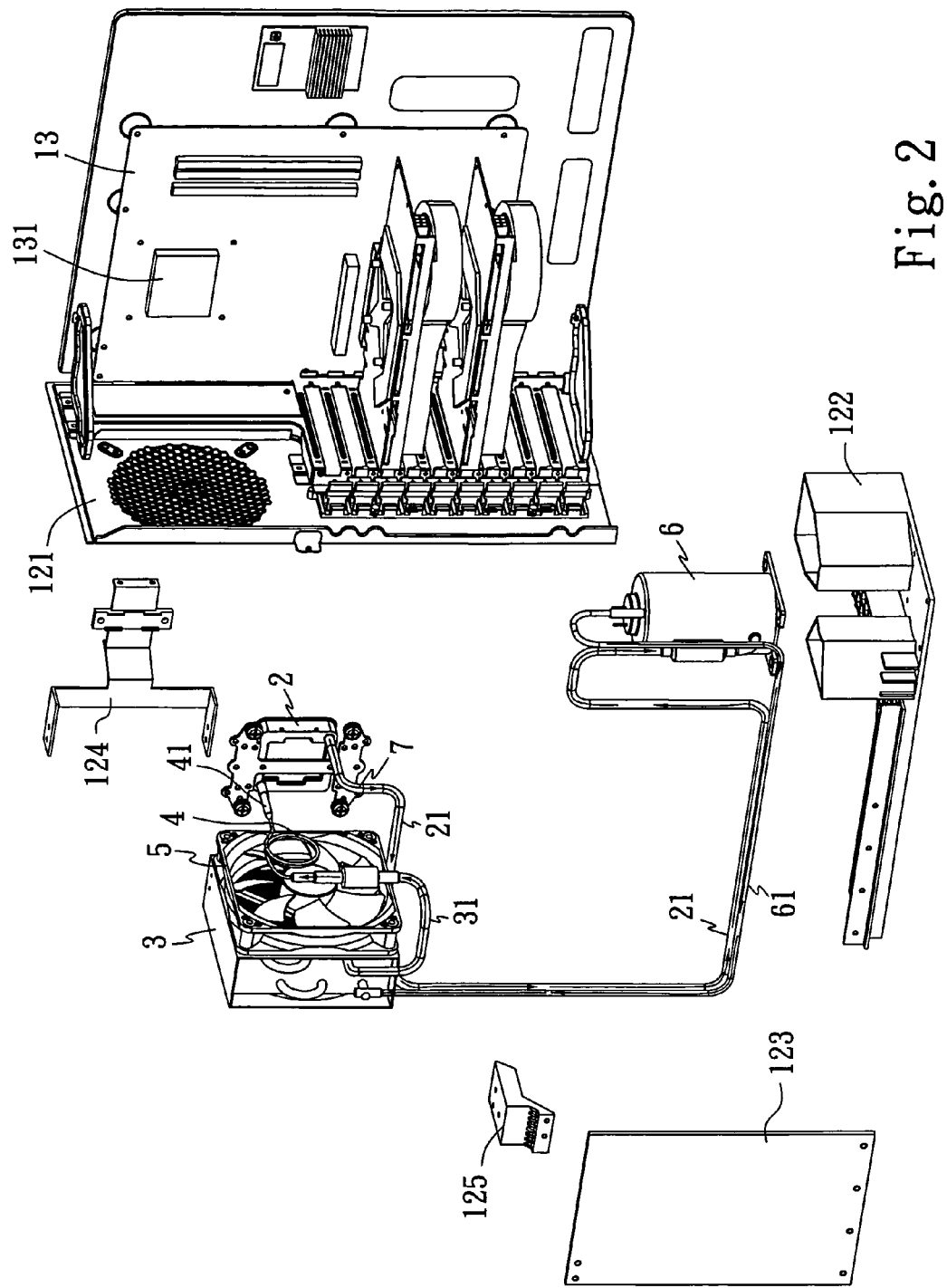
FIG. 2 is a schematic view of assembling a computer cooling apparatus in accordance with a first preferred embodiment of the present invention.
Figure 3:
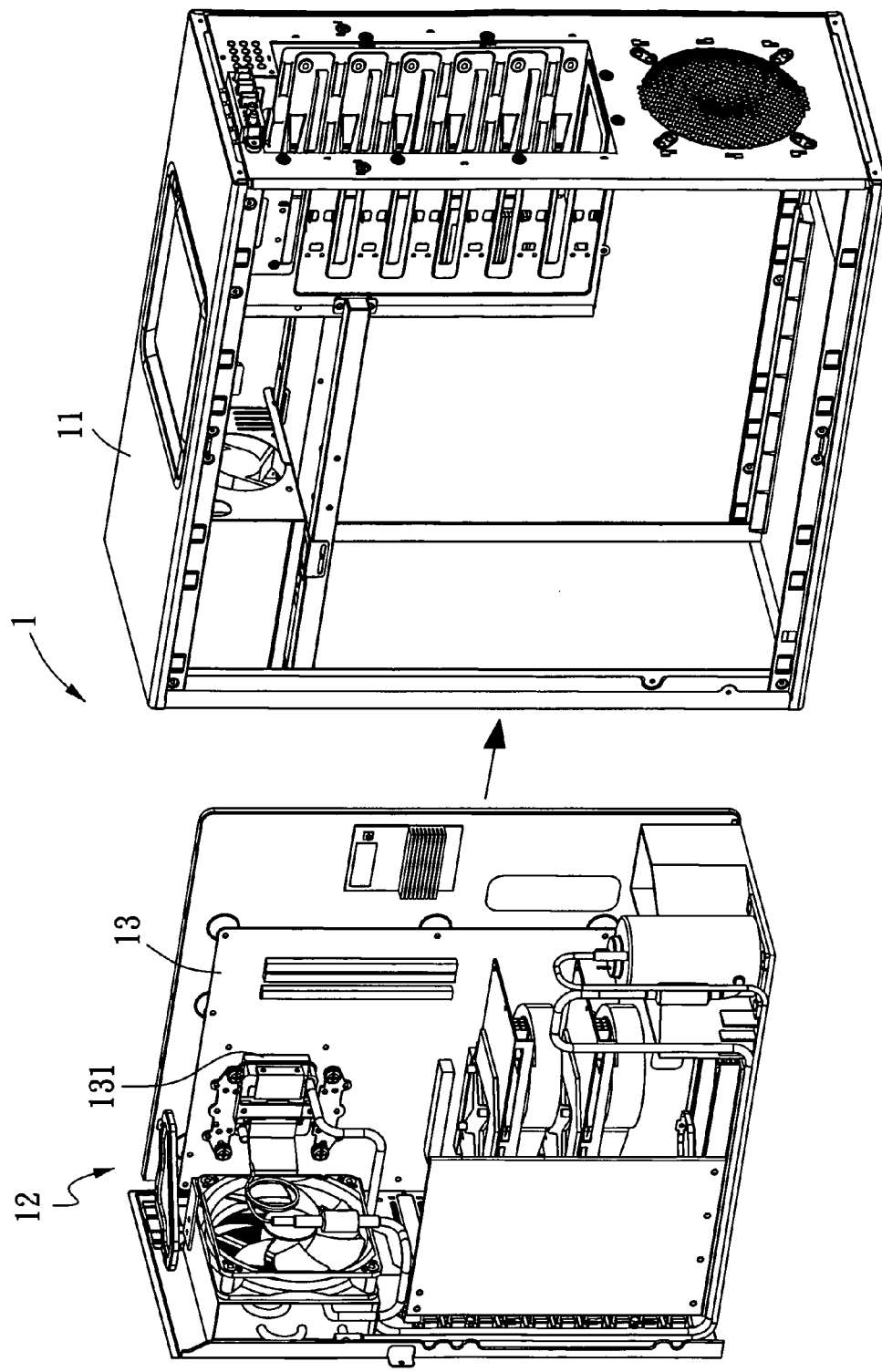
FIG. 3 is a schematic view of assembling another computer cooling apparatus in accordance with a first preferred embodiment of the present invention.
Figure 4:
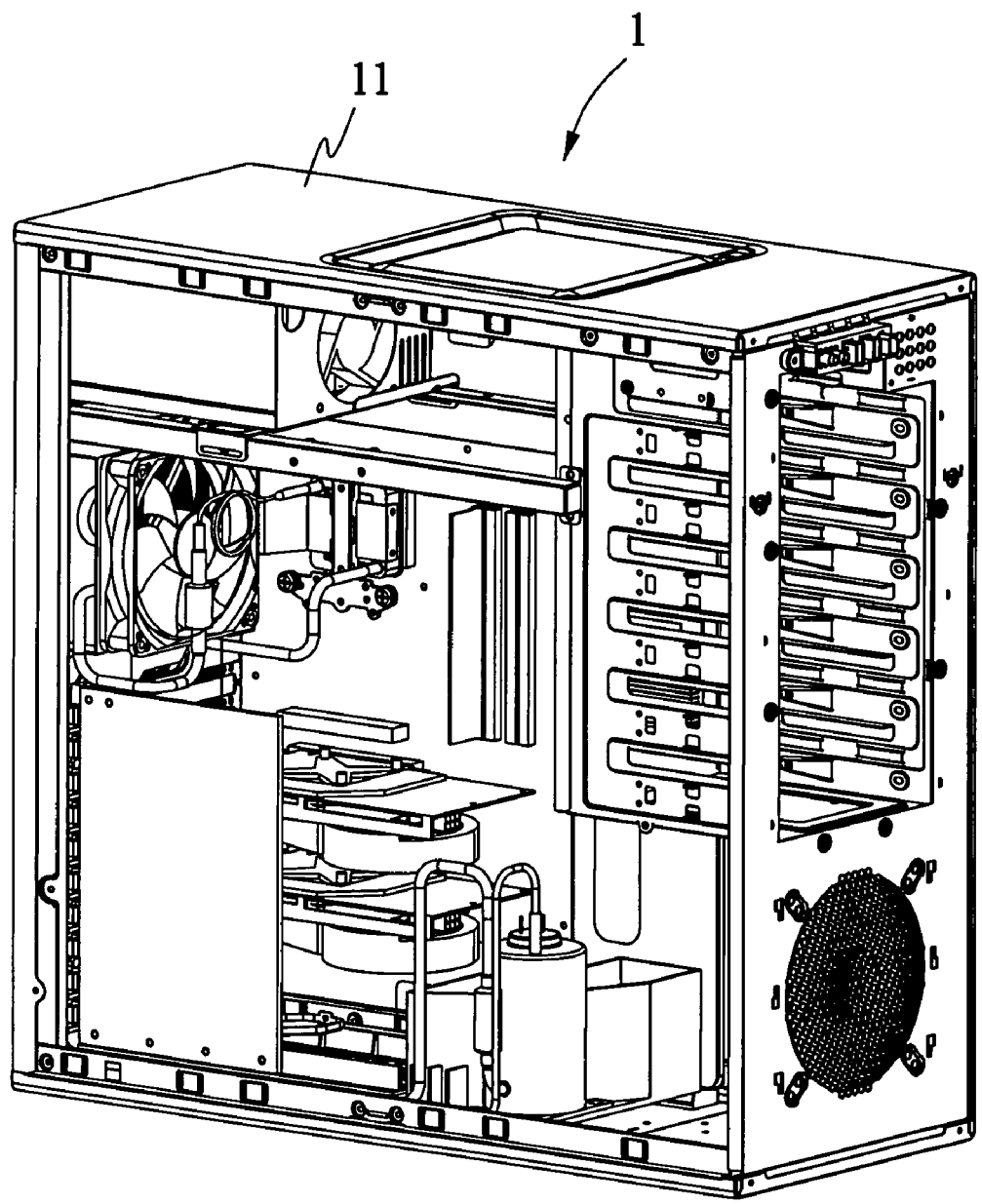
FIG. 4 is a schematic view of an assembled computer cooling apparatus in accordance with a first preferred embodiment of the present invention.

The above and other objects, features and advantages of the present invention will become apparent from the following detailed description taken with the accompanying drawing.

Referring to FIGS. 1 to 4 for a perspective view of a first preferred embodiment, two schematic views of assembling a computer cooling apparatus in accordance with a first preferred embodiment, and a schematic view of an assembled computer cooling apparatus in accordance with a first preferred embodiment of the present invention respectively, the improved computer cooling apparatus of the invention comprises an evaporator 2, a compressor 6, a condenser 3, a fan 5, an expansion valve 4 and a coolant 7.

The evaporator 2 is installed on a surface of a central processing unit 131, and the central processing unit 131 is installed on a motherboard 13 of a computer system unit 1, and the compressor 6 is connected to the evaporator 2, and the condenser 3 is connected to the compressor 6, and the expansion valve 4 is connected between the condenser 3 and the evaporator 2, and the fan 4 is installed on a surface of the condenser 3, and the coolant 7 is circulated among the evaporator 2, the compressor 6, the condenser 3 and the expansion valve 4.

The computer system unit 1 further includes a casing 11, and an assembly frame 12 disposed in the casing 11 and having a support stand 121, a fixing base 122, a first fixing frame 123 and a second fixing frame 124. The motherboard 13 and the fixing base 122 are fixed to the support stand 121, and the compressor 6 is fixed at the fixing base 122, and the first fixing frame 123 is fixed to the condenser 3 and the fixing base 122, and the second fixing frame 124 is fixed to the condenser 3 and the evaporator 2. The computer system unit 1 further includes a third fixing frame 125 fixed between the first fixing frame 123 and the condenser 3.

The evaporator 2, the compressor 6, the condenser 3 and the expansion valve 4 are connected by a hard or soft tube 21, 61, 31, 41.

When the computer cooling apparatus of the invention is assembled, a motherboard 13 is fixed to the support stand 121, and the fixing base 122 is used for retaining the compressor 6, and the first fixing frame 123 is fixed to the fixing base 122 and the third fixing frame 125, and the condenser 3 is fixed to the third fixing frame 125, and the second fixing frame 124 is fixed to the condenser 3 and the evaporator 2, and then the fixing base 122 is fixed to the support stand 121, and the evaporator 2 is attached onto the central processing unit 131 by a thermal conducting adhesive or another thermal conducting medium (not shown in the figure), and the condenser 3 and the fan 5 are fixed onto a rear panel of the support stand 121, and finally the support stand 121 is placed into the rear of the casing 11 to complete the installation of the computer cooling apparatus of the invention. In the foregoing assembling process, the evaporator 2, the condenser 3 and the compressor 6 are fixed, and then mounted in the support stand 121, and finally pushed into the casing 11, and thus the installation can be modularized to improve the assembling efficiency. Further, the motherboard 13, the compressor 6 and the condenser 3 can also be fixed onto a side panel (not shown in the figure) of the casing 11, and a side of the side panel is pivotally coupled to the casing 11, such that the side panel can be shut or opened at a lateral side of the casing 11 for allowing the motherboard 13, the evaporator 2, the compressor 6, the condenser 3, the fan 5 and the expansion valve 4 to be hidden or exposed from the casing 11 by shutting or opening the side panel respectively for easy maintenance and repair.

If the motherboard 13 is operated and heat is generated by the central processing unit 131, the evaporator 2 will absorb the heat of the central processing unit 131. Now, the compressor 6 is stepped up to drive the coolant 7 that absorbs heat entered into the condenser 3 and the fan 5 dissipates heat, and then the coolant 7 with the exchanged heat is stepped down by the expansion valve 4, and the cooled coolant 7 is transmitted to the evaporator 2 to prepare for the next heat absorption. Such arrangement can achieve a quick way of dissipating the heat from the central processing unit 131.

Figure 5:
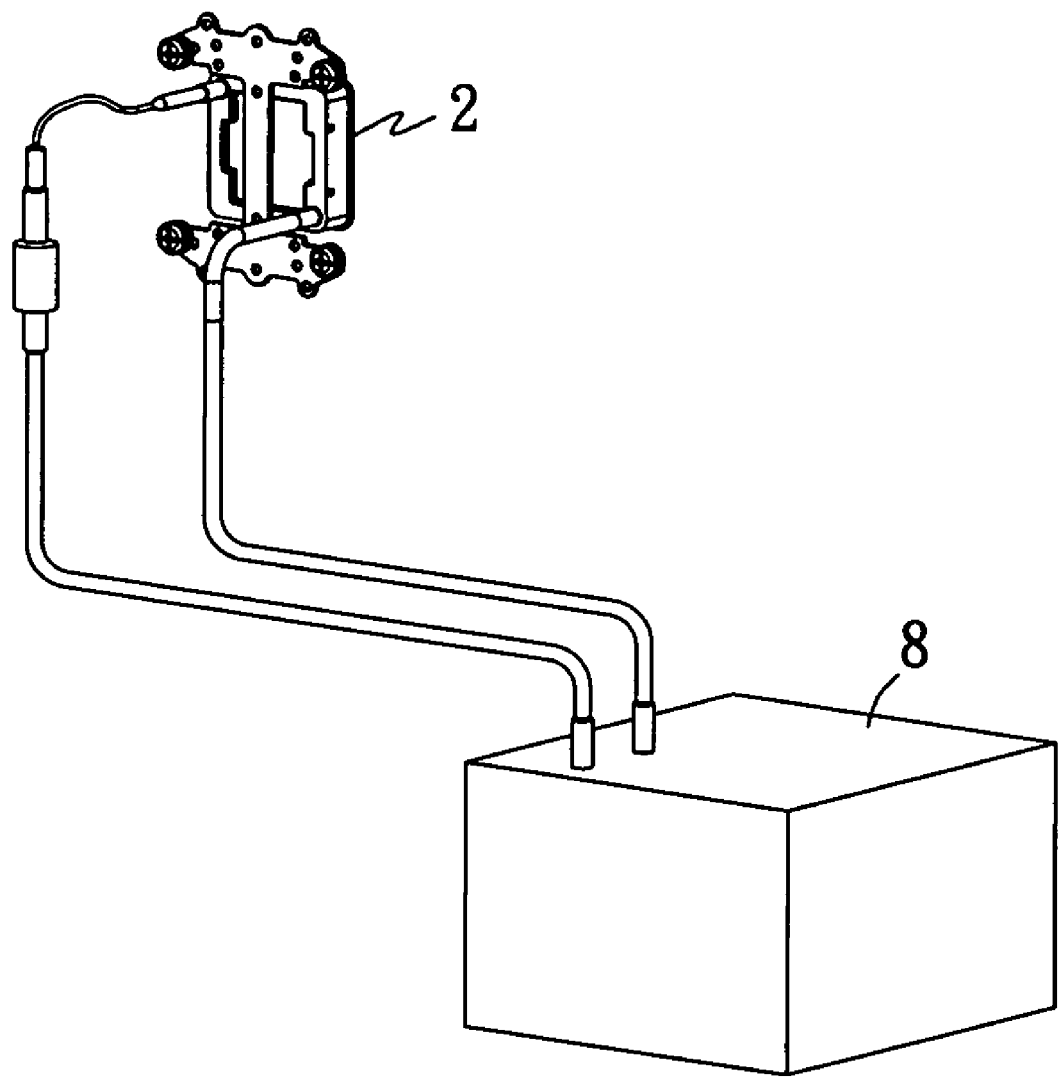
FIG. 5 is a perspective view of a second preferred embodiment of the present invention.
Figure 6:
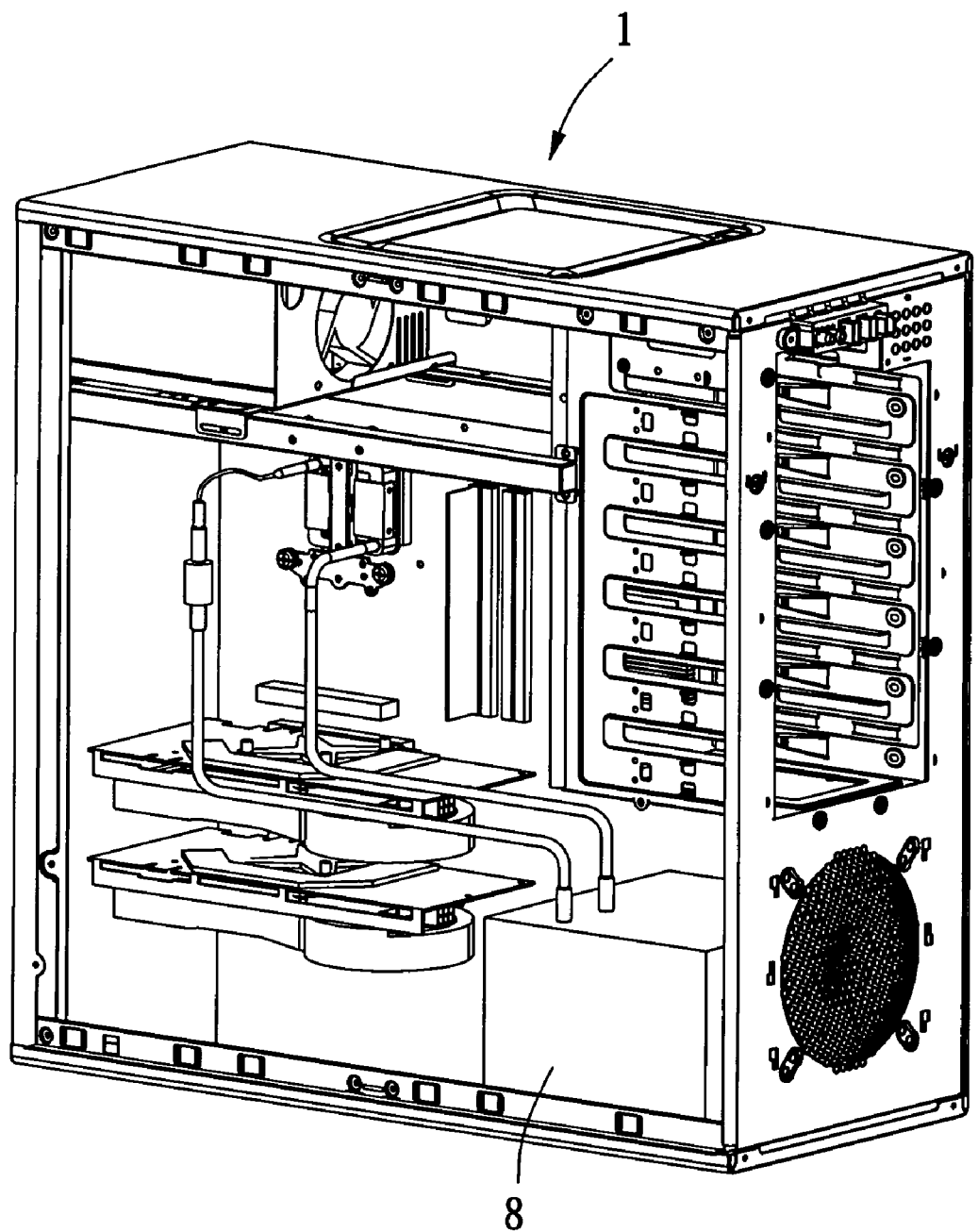
FIG. 6 is a schematic view of assembling a computer cooling apparatus in accordance with a second preferred embodiment of the present invention.
Figure 7:
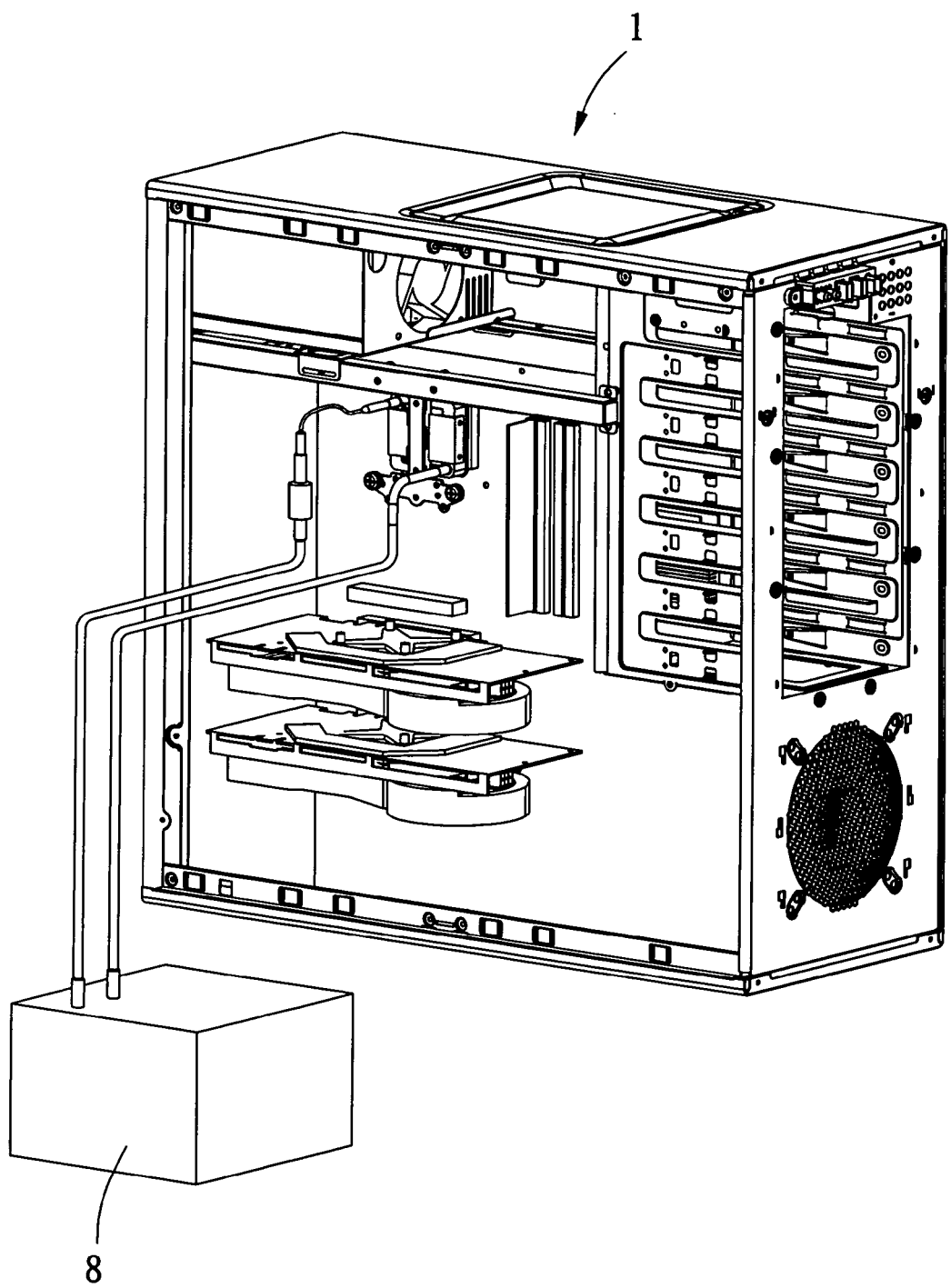
FIG. 7 is a schematic view of assembling another computer cooling apparatus in accordance with a second preferred embodiment of the present invention.

Referring to FIGS. 5 to 7 for a perspective view of a second preferred embodiment and two schematic views of assembling a computer cooling apparatus in accordance with a second preferred embodiment of the present invention respectively, as well as FIG. 1, this embodiment comes with a structure similar to that of the first preferred embodiment as shown in FIG. 1, except that the compressor 6, the condenser 3, the fan 5 and the expansion valve 4 are installed in a casing 8, and the evaporator 2 is disposed outside the casing 8. During the installation process, the evaporator 2 is attached onto the central processing unit 131 of the motherboard 13, and the casing 8 can be disposed inside or outside the computer system unit 1 according to actual needs. Similarly, a quick way of dissipating the heat from the central processing unit 131 can be achieved.

Figure 8:
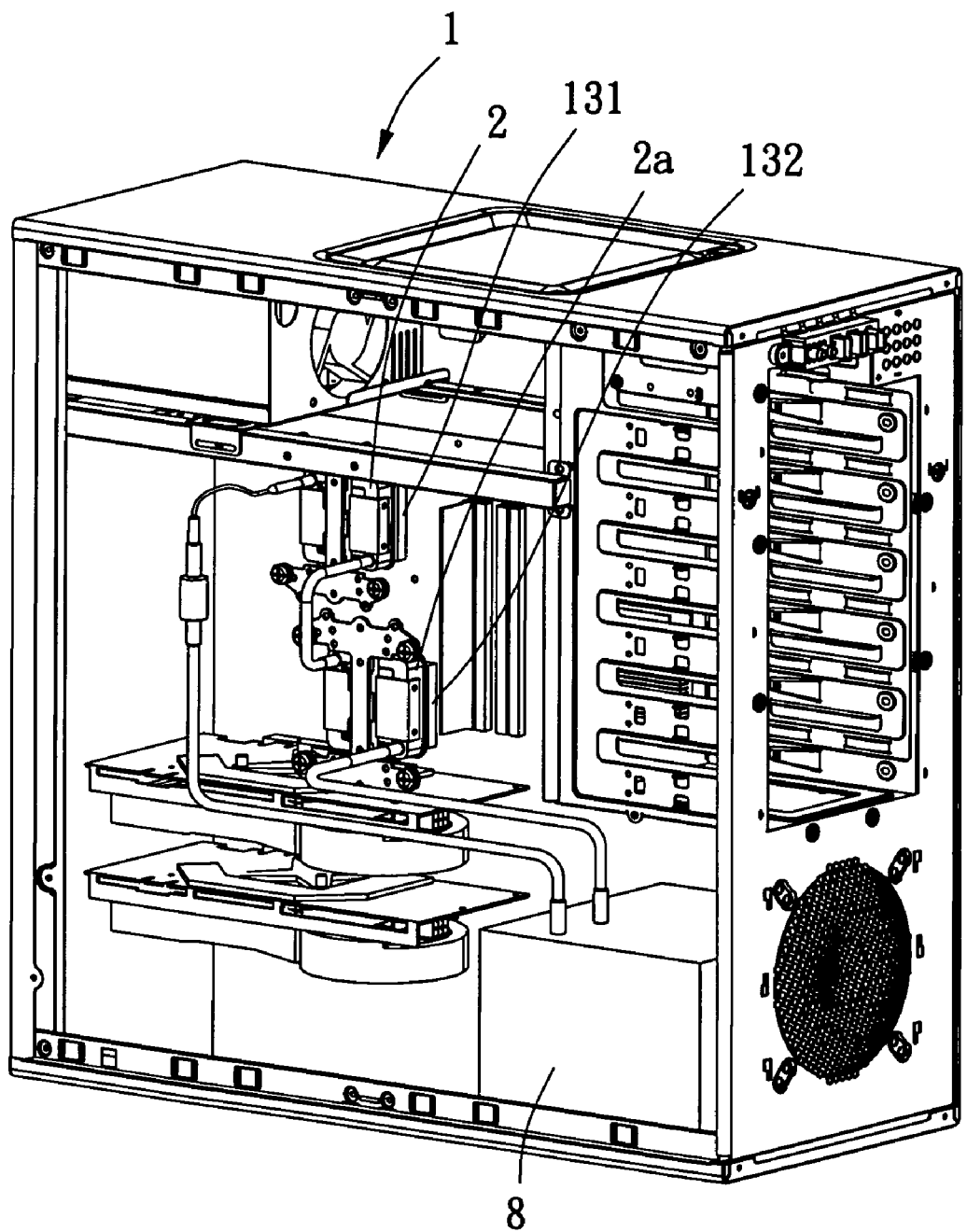
FIG. 8 is a schematic view of an application in accordance with a third preferred embodiment of the present invention.

Referring to FIG. 8 for a schematic view of an application in accordance with a third preferred embodiment of the present invention, this embodiment comes with a structure similar to those of the first and second preferred embodiments, except that a plurality of evaporators 2, 2a are connected with each other in series if needed, so that each evaporator 2, 2a is attached to a related heat generating source such as a central processing unit 131 and a related electronic chip 132 or a processor chip (not shown in the figure) on an interface card (not shown in the figure) in the computer system unit 1. The heat can be dissipated by the same method as described in the first preferred embodiment, so that the heat produced by the central processing unit 131 and the related electronic chip 132 or a processor chip on an interface card can be dissipated quickly. In FIG. 1, the evaporator 2, the compressor 6, the condenser 3 and the expansion valve 4 are connected by a hard or soft tube 21, 61, 31, 41 similarly. In FIGS. 1 to 4, the computer system unit 1 similar to the first preferred embodiment further comprises a casing 11, and the casing 11 contains an assembly frame 12, a compressor 6 and a condenser 3 fixed to an assembly frame 12, and the detailed assembling process is the same as that of the first preferred embodiment. In FIGS. 1 and 5 to 7, the second preferred embodiment installs the compressor 6, the condenser 3, the fan 5 and the expansion valve 4 in a casing 8, and the evaporator 2 is disposed outside the casing 8, and the casing 8 is installed inside or outside the computer system unit 1.

In summation of the description above, the improved computer cooling apparatus of the invention overcomes the shortcomings of the prior art effectively, and the evaporator, the compressor, the condenser, the fan, the expansion valve and the coolant are used to achieve the effect of quickly dispersing the heat generating source in the computer system unit. The invention complies with the requirements of patent application, and thus is duly filed for patent application.

While the invention has been described by means of specific embodiments, numerous modifications and variations could be made thereto by those skilled in the art without departing from the scope and spirit of the invention set forth in the claims.

What is claimed is:

1. A computer cooling apparatus, comprising:
a first evaporator installed on a surface of a central processing unit, the central processing unit being installed on a motherboard of a computer system unit, and a second evaporator installed on an electronic chip;
a compressor, coupled to the first evaporator and the second evaporator;
a condenser, coupled to the compressor;
an expansion valve, coupled between the condenser and the first evaporator and the second evaporator;
a fan, installed on a surface of the condenser;
a coolant, circulated among the first evaporator, the second evaporator, the compressor, the condenser and the expansion valve; a computer system unit casing; and an assembly frame disposed within the computer system unit casing, the assembly frame including a support stand, a fixing base, a first fixing frame and a second fixing frame, the first fixing frame being directly fixed to the condenser and the fixing base;

wherein the evaporator and the condenser are directly fixed to the second fixing frame and a rear panel of the support stand;

wherein the compressor is directly fixed to the fixing base for retaining the compressor;

wherein the compressor, the condenser, the fan, and the expansion valve are installed in a casing, and the first evaporator and the second evaporator are disposed outside the casing;

wherein the casing is disposed outside the computer system unit casing, and the first evaporator and the second evaporator are disposed within the computer system unit casing.

2. The improved computer cooling apparatus of claim 1, wherein the assembly frame further comprises a third fixing frame fixed between the first fixing frame and the condenser.

3. The improved computer cooling apparatus of claim 1, wherein the first evaporator, the second evaporator, the compressor, the condenser and the expansion valve are connected by a hard or soft tube.

4. A computer cooling apparatus, comprising:

a first evaporator installed on a surface of a first heat generating source, and a second evaporator installed on a second heat generating source, the first and second heat generating sources being disposed in a computer system unit;

a compressor, coupled to the first evaporator and the second evaporator;

a condenser, coupled to the compressor;

an expansion valve, coupled between the condenser and the first evaporator and the second evaporator;

a fan, installed on a surface of the condenser;

a coolant, circulated among the first evaporator, the second evaporator, the compressor, the condenser and the expansion valve; a computer system unit casing; and an assembly frame disposed within the computer system unit casing, the assembly frame including a support stand, a fixing base, a first fixing frame and a second fixing frame, the first fixing frame being directly fixed to the condenser and the fixing base;

wherein the evaporator and the condenser are directly fixed to the second fixing frame and a rear panel of the support stand;

wherein the compressor is directly fixed to the fixing base for retaining the compressor.

5. The improved computer cooling apparatus of claim 2, wherein the assembly frame further comprises a third fixing frame fixed between the first fixing frame and the condenser.

6. The improved computer cooling apparatus of claim 4, wherein the first evaporator, the second evaporator, the compressor, the condenser and the expansion valve are connected by a hard or soft tube.

* * * * *